United States Patent Office 3,403,110
Patented Sept. 24, 1968

3,403,110
PROCESS FOR PREPARING A CRYSTALLINE
ZEOLITE CATALYST COMPOSITE
William Eugene Sanborn, Wilton, and John Francis Lindsley, Glenbrook, Conn., assignors to American Cyanamid Company, Stamford, Conn., a corporation of Maine
No Drawing. Filed Sept. 14, 1964, Ser. No. 396,364
6 Claims. (Cl. 252—455)

ABSTRACT OF THE DISCLOSURE

A process is disclosed for combining inorganic oxide hydrogels and crystalline aluminosilicates, whereby when the composite is activated by the application of heat, the destruction of the crystalline aluminosilicate is minimized. The process specifies that this result may be accomplished by reacting with an inorganic oxide hydrogel and inorganic metal oxide or hydroxide such as calcium oxide and thereafter intimately associating the so reacted hydrogel with crystalline aluminosilicates. The intimate associated mixture is thereafter converted to a catalyst material by the application of heat, as by spray drying.

This invention relates to aluminosilicate-inorganic oxide gel catalyst materials and more particularly to an improved process for preparing such catalyst material.

Crystalline metal aluminosilicates per se have recently been described as catalyst materials, as have composites of such materials with various inorganic oxides. See, for example, U.S. Patent 2,971,903, U.S. Patent 2,962,435, U.S. Patent 3,140,249, and U.S. Patent 3,140,253. With regard to composites of crystalline metal aluminosilicates and inorganic oxides, various methods of synthesizing these materials are disclosed in U.S. Patent 2,962,435, U.S. Patent 3,140,249, and U.S. Patent 3,140,253.

A seemingly simple procedure for preparing such composites would be to intimately mix or associate the inorganic oxide hydrogel and the crystalline metal aluminosilicate as in a homogenizer, pug mill, blender, or the like. In employing such techniques, it has been discovered that such composites, when activated to catalyst materials by the application of heat to form the products of this invention, have to a substantial degree, and in some instances, had the crystalline aluminosilicate completely destroyed.

Accordingly, it is an object of this invention to provide a process for combining inorganic oxide hydrogels and crystalline aluminosilicates whereby when the composite is activated by the application of heat the destruction of the crystalline aluminosilicate is minimized.

It is a further object to provide a simple and inexpensive method for preparing catalyst composites of crystalline aluminosilicates and inorganic oxides which is readily adaptable to conventional processing equipment and is a simple straightforward procedure.

These and other objects and advantages of the present invention will become apparent from the detailed description thereof set forth hereinbelow.

In accordance with the present invention, a process is provided for preparing a catalyst which comprises reacting an inorganic oxide hydrogel with an inorganic metal oxide or hydroxide of the metals selected from Group I-B through Group VIII of the Periodic Table, intimately associating with the so-reacted inorganic oxide hydrogel a finely divided crystalline Group I-B through Group VIII metal aluminosilicate having a structure of rigid three-dimensional networks characterized by uniform pores and thereafter converting said composition to a catalyst by the application of heat.

The inorganic oxide hydrogel may be a single metal oxide hydrogel such as silica hydrogel, or it may be a mixture of hydrogels, one hydrogel coated with one or more other metal oxide hydrogels, or a cogel of inorganic oxides. For example, combinations of hydrogels might include silica hydrogel and in oxide hydrogel of one or more metals of the group consisting of metals of Group II-A, III-B and IV-A of the Periodic Table. Such combinations include, for example, silica-alumina, silica-magnesia, silica-zirconia, silica-alumina-magnesia, silica-alumina-thoria, silica-alumina-zirconia, and the like. The particular preferred hydrogel combination in accordance with this invention is that of silica-alumina in which the alumina is usually present in amounts of from between 10 and about 30% based on the dry weight of the silica-alumina composite.

As was pointed out heretofore, a particularly preferred inorganic oxide hydrogel mixture is that of silica and alumina, in which the alumina is present in amounts of from between 10 and 30% by weight, based on the dry weight of the silica-alumina. The silica-alumina hydrogel may be prepared in accordance with conventional procedures, as for example those described in U.S. Patent No. 3,023,172 and U.S. Patent No. 2,701,793.

In accordance with the process of this invention, the inorganic oxide hydrogel is first reacted with an inorganic metal oxide or hydroxide of the metals selected from Group I-B through Group VIII of the Periodic Table. In essence, thus any metal of the Periodic Table with the exception of the alkali metals, that is, sodium, potassium and lithium, are contemplated for reaction with the inorganic oxide hydrogel. Particularly preferred metal oxides for reaction with the inorganic oxide hydrogel include the alkaline earth metal oxides, as for example magnesium, calcium, strontium and barium oxides. Of these, calcium oxide is preferred.

The reaction between the inorganic oxide hydrogel and the inorganic metal oxide of the metals selected from Group I-B through Group VIII, and preferably the alkaline earth metals, is preferably conducted by simply slurrying the inorganic oxide hydrogel with the metal hydroxide, as for example calcium hydroxide, and permitting the reaction to go to completion. The rate of reaction may be accelerated in this case by a heating of the metal hydroxide and inorganic oxide hydrogel at temperatures from room temperature up to 100° C. The amount of metal oxide reacted may be anywhere from between ½ and 10%, based on the dry weight of the inorganic oxide hydrogel, and preferably is an amount of from between 1 and 3%.

The crystalline aluminosilicates having a structure of rigid three-dimensional networks and characterized by uniform pores are sometimes described as synthetic zeolites and may be prepared in accordance with U.S. Patent Nos. 2,882,243, 2,882,244, and 3,130,007. These materials as prepared are essentially the dehydrated forms of crystalline hydrous siliceous zeolites containing varying quantities of alkali metal and/or other monovalent cation and aluminum with or without other metals. The alkali metal atoms and/or other monovalent cations, silicon, aluminum and oxygen, in these zeolites are arranged in the form of an aluminosilicate salt in a definite and consistent crystalline pattern. The structures normally contain a number of small cavities and are connected by a number of still smaller holes or channels. These cavities and channels are uniform in size and are characterized by an effective pore diameter of from between 6 and 15 angstroms.

Commercially, these synthetic zeolites are available from the Union Carbide Company and are referred to as molecular sieves.

As employed, these crystalline metal alumino-silicates are finely divided and are characterized by a mean weight particle diameter of less than 10 and preferably within the range of 2 to 7 microns.

The crystalline metal aluminosilicates that are intimately associated with the inorganic oxide hydrogels have been base exchanged with a polyvalent cation of Group I–B through Group VIII metals.

As indicated above, a wide variety of metallic compounds can be employed as a source of polyvalent metallic cation and include both inorganic and organic salts of the metals of Group I–B through Group VIII of the Periodic Table. Representative of salts which can be employed include chlorides, bromides, iodides, carbonates, bicarbonates, sulfates, acetates, citrates, fluorides and the like. The metal salts may be employed singly or in combination with one another and they must have appreciable solubility in the fluid medium in which they are employed.

Intimate association of the inorganic oxide hydrogel which has been reacted or combined with an inorganic metal oxide of the metals selected from Group I–B through Group VIII, with the crystalline metal aluminosilicate, may be accomplished by a number of procedures such as by ball-milling the two materials for extended periods of time or by homogenizing the hydrogel with the aluminosilicate whereby the hydrogel and aluminosilicate are subjected to high shear, as for example, as is achieved by the passage of the mixture through a narrow orifice under high pressure. In addition, the hydrogel and aluminosilicate may be intimately associated as by blending in a high speed blender in which the composition is subjected to high shear, as for example in a Waring Blendor.

After forming the intimately associated composite, it is activated to a catalyst by the application of heat, illustratively as by oven drying, spray drying, calcining, and the like. Normally, the activating temperature should not exceed about 1100 or 1200° F., though activation may be effected at temperatures of from between about 500 to about 1500° F.

The crystalline metal aluminosilicates may be incorporated into the catalysts of this invention in amounts of from between 5 and about 90%, based on the weight of the finished catalyst, though preferably are employed or present in amounts of from between about 5 and 25%, based on the weight thereof. Uniformly good cracking catalyst has been prepared containing amounts of from between about 7 and about 15% by weight.

The catalysts of this invention may be employed in the form of spheres, microspheres, pellets, extrudates, or in any other form such as are described in the above referred to U.S. Patent 3,140,249. A preferred form is the microspheroidal form in which the intimately associated inorganic oxide hydrogel and the metal aluminosilicate are spray dried. Spray drying, in accordance with the present invention, is accomplished by spraying the intimately associated composition through a nozzle or off a spray wheel in contact with hot gases. Such drying may be accomplished by any suitable spray drier. One that has been employed with success is described in U.S. Patent No. 2,644,516, dated July 7, 1953. Although gas inlet temperatures of up to 1300° F. may be employed, the temperature of the drying gas entering the spray drying chamber is preferably controlled within the range of about 400 and 1000° F. so that the intimately associated mixture will be converted into a set, partially dehydrated microspheroidal gel particle. Spray drying normally results in a moisture content of from between about 10 and 20% of the spray dried product.

The catalysts of this invention are useful in the catalytic conversion of high boiling hydrocarbons to lower boiling hydrocarbons, and this is done principally by cracking; but this reaction is accompanied by a number of complex side reactions, including aromatization, polymerization, alkylation, and the like. In the cracking of high boiling hydrocarbons, the catalyst has demonstrated excellent selectivity, providing enhanced yields of gasoline while maintaining undesirable end products, such as coke, at a minimum. In addition, the catalysts have demonstrated good stability to steaming and carbon burning.

As a fluid bed cracking catalyst in the conversion of hydrocarbons, the catalyst particles produced in accordance with this invention are in a state of suspension in a vaporous stream of hydrocarbon and the cracking is effected or carried out at temperatures in the range of between 700 and 1100° F. and preferably between 900 and 1000° F.

The catalyst of this invention normally will contain from 85 to 95% of inorganic oxide hydrogel derivative and 5 to 15% of synthetic crystalline metal zeolite.

In order to illustrate the present invention, the following examples are given primarily by way of illustration. No specific details or enumerations contained therein should be construed as limitations on the present invention except insofar as they appear in the appended claims. All parts and percentages are by weight unless otherwise specifically designated.

EXAMPLE 1

222 parts of a 13% alumina, silica-alumina hydrogel as a filter cake and containing impurities such as iron and sodium at levels such as are normally present in commercial synthetic catalyst, and having a solids content of 8.9%, were blended with 4.38 parts of a calcium exchanged synthetic zeolite sold commercially as Linde 13X. Such synthetic zeolite, which is prepared in accordance with U.S. Patent No. 2,882,244, had a solids content of 49.3% and was blended in a Waring Blendor (Model 702 BAW) for 5 minutes with sufficient water being added to maintain the slurry fluid.

After filtering the slurry, the filter cake was dried for 2 hours at 180° C. in an electric oven. The sample was ground in a mortar. Half the sample was dried for an additional hour at 180° F. and the second half was calcined at 1100° F. for one hour in a muffle furnace. The resulting catalyst material would be expected to have a composition containing 10%, based on its total weight, of the calcium exchanged synthetic zeolite.

Analysis by X-ray demonstrated that less than 2% of the zeolite remained in either of the two samples.

EXAMPLE 2

222 parts of a 13% alumina, silica-alumina hydrogel of the type identified in Example 1 and containing 8.9% solids had added thereto 10 parts of a 5¼% aqueous ammonia to adjust the pH of the filter cake to 8.6, after which it was blended with 4.38 parts of the calcium exchanged synthetic zeolite having 49.3% solids identified in Example 1. The mixture was blended in a Waring Blendor (Model 702 BAW) for 5 minutes, with sufficient water being added to maintain the slurry fluid.

Filtration, drying and calcination were carried out in the identical manner set forth in Example 1.

The resulting catalyst material would be expected to contain 10%, based on the total weight of the catalyst material, of the calcium exchanged synthetic zeolite.

X-ray analysis of the oven-dried sample showed 9% by weight of the total catalyst of the synthetic zeolite, while the calcined samples showed 5.5% of the zeolite.

EXAMPLE 3

The identical materials, quantities and procedures set forth in Example 2 were employed here, except the silica-alumina filter cake and aqueous ammonia were agitated at an elevated temperature of 80° C. for one hour and then cooled before blending with the calcium exchanged synthetic zeolite.

Filtration, drying and calcination steps were the same as those described in Example 2.

The resulting catalyst material would be expected to contain 10%, based on the total weight of the material, of the calcium exchanged synthetic zeolite.

X-ray analysis of the oven-dried sample showed 10% of the sieve, and 5.5% of the sieve was in the calcined sample.

EXAMPLE 4

The same procedure as was employed in Example 1 was employed in this example, with the exception that .9 part of lime was added to the 222 parts of 13% silica-alumina hydrogel filter cake and reacted for one hour at 80° C. prior to being cooled and reacted with 4.5 parts of the calcium identified in Example 1.

Filtration, drying and calcination steps were the same as those employed in Example 1.

The resulting catalyst material would be expected to contain 10%, based on the total weight of the catalyst material, of the calcium exchanged synthetic zeolite.

X-ray analysis showed 10.5% of the synthetic zeolite in the oven-dried sample and 9% in the calcined sample.

X-ray analysis showed 11.5% of the calcium zeolite in both the oven-dried and calcined sample.

EXAMPLE 7

The same procedure as was employed in Example 4 was employed here except that 1.7 parts of lime were reacted with 189 parts of a 25% alumina, silica-alumina hydrogel filter cake and thereafter 4.6 parts of the calcium zeolite identified in Example 1 were blended therewith.

The resulting catalyst material would be expected to contain 10% of the calcium zeolite and 5% of calcium oxide based on the total weight of the catalyst material.

X-ray analysis showed 11.5% of the zeolite was found in the oven-dried sample and 10.5% in the calcined sample.

In order to summarize the information of Examples 1–7, the following table is provided.

TABLE I.—CALCIUM OXIDE ADDITION TO SILICA-ALUMINA HYDROGEL

| Example | Catalyst base | Percent CaO [1] | Percent zeolite [1] | NH4OH ml of 5¼% NH3 | pH | | | | X-ray analysis | |
|---|---|---|---|---|---|---|---|---|---|---|
| | | | | | Initial [2] | After heating [3] | After sieve | After drying 3 hrs. 180° C.[4] | After drying 180° C.+1 hr. 1,100° F.[4] | Dried 3 hrs. 180° C.[5] | Dried 2 hrs. 180° C.+1 hr. 1,100° F.[5] |
| 1 | 13% Al2O3 | 0 | 10 | 0 | 5.1 | | 5.1 | 6.1 | 5.3 | <2 | <2 |
| 2 | 13% Al2O3 | 0 | 10 | 10 | 8.6 | | 8.4 | 7.3 | 5.5 | 9.0 | 5.5 |
| 3 | 13% Al2O3 | 0 | 10 | 10 | 8.7 | 7.4 | 7.4 | 7.6 | 5.6 | 10.0 | 5.5 |
| 4 | 13% Al2O3 | 3 | 10 | 0 | 7.5 | 6.3 | 6.4 | 6.4 | 6.4 | 10.5 | 9.0 |
| 5 | 13% Al2O3 | 5 | 10.4 | 0 | 8.9 | 7.8 | 8.0 | 6.9 | 6.8 | 12.5 | 11.0 |
| 6 | 13% Al2O3 | 10 | 10 | 0 | 10.6 | 9.8 | 9.7 | 9.6 | 8.8 | 11.5 | 11.5 |
| 7 | 25% Al2O3 | 5 | 10 | 0 | 10.0 | 8.6 | 8.6 | 8.0 | 7.1 | 11.5 | 10.5 |

[1] CaO added as lime. Percent is of base+CaO+zeolite (dry basis).
[2] pH of base+lime or NH3 before heating. pH of base alone: 13% 5.1, 25% 7.0.
[3] 1 hour at 80±5° C.
[4] Sample slurried in 10 ml. of deionized water.
[5] Wet sample split and dried two ways.

EXAMPLE 5

The same procedure as was employed in Example 4 was employed in this example, except that 1.6 parts of lime were reacted with the 222 parts of the 13% alumina, silica-alumina hydrogel filter cake and 4.84 parts of the synthetic calcium zeolite were employed.

Filtration, drying and calcination were carried out as in Example 1.

The resulting catalyst material would be expected to contain 10.4% of the calcium zeolite and 5% of calcium oxide, based on the total weight of the catalyst material.

X-ray analysis showed 12.5% of the zeolite in the oven-dried sample and 11% of the zeolite in the calcined sample.

EXAMPLE 6

The same procedure as is outlined in Example 4 was employed here except that 3.2 parts of lime were added to the 222 parts of the 13% alumina, silica-alumina hydrogel filter cake and 4.84 parts of the calcium synthetic zeolite were blended therewith.

Filtration, drying and calcination were carried out as in Example 1.

The resulting catalyst material would be expected to contain 10% of the calcium zeolite and 10% of calcium oxide based on the total weight of the catalyst material.

A review of Table I hereinabove demonstrates that only by the adjustment of the pH of the inorganic oxide hydrogel base, as by the addition of an alkaline agent, can the synthetic zeolite be preserved in the final catalyst composition after subjecting the composite to the action of heat.

Example 8

72 parts of 13% alumina, silica-alumina hydrogel washed filter cake slurry, having a solids content of 6.0%, were blended with 0.25 part of magnesium oxide. The blend was heated at 80±5° C. for three hours. After cooling the slurry to 50° C., 0.98 part of calcium silicoaluminate (41.5% solids) were added. The resulting mixture was agitated and then spray dried.

A sample of the spray dried material was calcined for one hour at 1100° F. X-ray analysis showed 6% crystalline material.

Example 9

The same procedure as was employed in Example 8 was employed, except that 68 parts of 13% Al2O3 slurry at 6.4% solids, 0.55 part of magnesium oxide, and 1.46 parts of the calcium silicoaluminate were used. X-ray analysis of the calcined sample showed 7.0% crystalline material.

Table II hereinbelow summarizes the data on the catalysts prepared in Examples 8 and 9 and further demonstrates the merit of this invention.

TABLE II.—MAGNESIUM OXIDE ADDITION TO SILICA-ALUMINA HYDROGEL

| Ex. | Catalyst base [1] | Percent MgO | Percent Ca sieves | pH | | | X-ray analysis |
|---|---|---|---|---|---|---|---|
| | | | | Initial | After heating [2] | After sieves | 1,100° F., 1 hr. of spray dried sample |
| 8 | 13% Al2O3 | 5 | 8 | 9.0 | 8.7 | 8.9 | 6.0 |
| 9 | 13% Al2O3 | 10 | 11 | 9.9 | 8.8 | 8.9 | 7.0 |

[1] Same base as used in calcium oxide addition tests.
[2] 3 hours at 80±5° C.

It will be apparent that other promoters may be employed in the catalyst composites of this invention, as for example minor amounts of the rare earth elements such as cerium, metals such as tungsten, palladium, platinum, and the like, to achieve special effects in cracking, hydrocracking, reforming and hydrogenation processes.

We claim:

1. A process for preparing a catalyst which comprises reacting an inorganic oxide hydrogel with a compound selected from the group consisting of inorganic metal oxide and inorganic metal hydroxide of the metals selected from Group I–B through Group VIII of the Periodic Table, intimately associating with the so-reacted inorganic oxide hydrogel a finely divided crystalline Group I–B through Group VIII metal aluminosilicate having a structure of rigid three-dimensional networks characterized by uniform pores, and thereafter converting said composition to a catalyst by the application of heat.

2. A process for preparing a catalyst which comprises reacting an inorganic oxide hydrogel composed of silica and an oxide of at least one metal selected from the group consisting of metals of Groups II–A, III–B and IV–A of the Periodic Table with a compound selected from the group consisting of inorganic metal oxide and inorganic metal hydroxide of the metals selected from Group I–B through Group VIII, intimately associating with the so-reacted inorganic oxide hydrogel a finely divided crystalline Group I–B through Group VIII metal aluminosilicate having a structure of rigid three-dimensional networks characterized by uniform pores, and thereafter converting said composition to a catalyst by the application of heat.

3. A process for preparing a catalyst which comprises reacting a silica-alumina hydrogel with a compound selected from the group consisting of an alkaline earth metal oxide and alkaline earth metal hydroxide, intimately associating with the so-reacted silica-alumina hydrogel a finely divided crystalline Group I–B through Group VIII metal aluminosilicate having a structure of rigid three-dimensional networks characterized by uniform pores, and thereafter converting said composition to a catalyst by the application of heat.

4. A process for preparing a catalyst which comprises reacting a silica-alumina hydrogel with a compound selected from the group consisting of an alkaline earth metal oxide and alkaline earth metal hydroxide, intimately associating with the so-reacted silica-alumina hydrogel a finely divided crystalline alkaline earth metal aluminosilicate having a structure of rigid three-dimensional networks characterized by uniform pores, and thereafter converting said composition to a catalyst by the application of heat.

5. A process for preparing a catalyst which comprises reacting a silica-alumina hydrogel with a compound selected from the group consisting of calcium oxide and calcium hydroxide, intimately associating with the so-reacted silica-alumina hydrogel a finely divided crystalline calcium aluminosilicate having a structure of rigid three-dimensional networks characterized by uniform pores, and thereafter converting said composition to a catalyst by the application of heat.

6. A process according to claim 5 in which the catalyst prepared is a microspheroidal catalyst and in which an intimately associated silica-alumina hydrogel-crystalline aluminosilicate mixture is converted to a catalyst material by spray drying.

References Cited

UNITED STATES PATENTS

| | | | |
|---|---|---|---|
| 3,070,639 | 12/1962 | Geerts et al. | 252—454 XR |
| 3,215,639 | 11/1965 | Chomitz | 252—455 |
| 3,291,754 | 12/1966 | Hanisch et al. | 252—455 |

DANIEL E. WYMAN, *Primary Examiner.*

C. F. DEES, *Assistant Examiner.*